United States Patent
Zhang et al.

(10) Patent No.: US 10,256,956 B2
(45) Date of Patent: Apr. 9, 2019

(54) METHOD AND APPARATUS FOR IMPLEMENTING UPLINK TRANSMISSION IN FLEXIBLE FREQUENCY DIVISION DUPLEX SYSTEM

(71) Applicant: Samsung Electronics Co., Ltd., Suwon-si, Gyeonggi-do (KR)

(72) Inventors: Shichang Zhang, Beijing (CN); Yingyang Li, Beijing (CN); Chengjun Sun, Beijing (CN); Jingxing Fu, Beijing (CN); Yunchuan Yang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 15/306,350

(22) PCT Filed: Apr. 23, 2015

(86) PCT No.: PCT/KR2015/004040
§ 371 (c)(1),
(2) Date: Oct. 24, 2016

(87) PCT Pub. No.: WO2015/163701
PCT Pub. Date: Oct. 29, 2015

(65) Prior Publication Data
US 2017/0048040 A1    Feb. 16, 2017

(30) Foreign Application Priority Data

Apr. 25, 2014  (CN) .......................... 2014 1 0171095

(51) Int. Cl.
*H04L 5/00*     (2006.01)
*H04B 7/26*     (2006.01)
(Continued)

(52) U.S. Cl.
CPC .......... *H04L 5/0048* (2013.01); *H04B 7/2621* (2013.01); *H04L 1/1861* (2013.01); *H04L 5/14* (2013.01); *H04W 74/0833* (2013.01)

(58) Field of Classification Search
CPC ... H04B 7/2621; H04L 1/1861; H04L 5/0048; H04L 5/14; H04W 74/0833
See application file for complete search history.

(56) References Cited

U.S. PATENT DOCUMENTS

2007/0248043 A1  10/2007  Afrashteh et al.
2012/0063373 A1   3/2012  Chincholi et al.
(Continued)

FOREIGN PATENT DOCUMENTS

CN  101132615 A   2/2008
CN  101621849 A   1/2010
(Continued)

OTHER PUBLICATIONS

Huawei et al., Motivation of New SI Proposal: Evolving LTE with Flexible Duplex for Traffic Adaptation, 3GPP TSG RAN Meeting #63, Fukuoka, Japan, Mar. 3-6, 2014, RP-140426.
(Continued)

*Primary Examiner* — Dang T Ton
(74) *Attorney, Agent, or Firm* — Jefferson IP Law, LLP

(57) ABSTRACT

A method for implementing uplink transmission in a flexible frequency division duplex (FDD) system is provided. A flexible FDD supported user equipment (FFUE) receives signaling from an evolved node B (eNB), obtains an uplink carrier configuration, and performs physical uplink shared channel (PUSCH) transmission by way of synchronous HARQ of 8 ms, synchronous HARQ of 10 ms, or asynchronous hybrid automatic repeat request (HARQ). According to the solution provided by the present invention, uplink transmission in the FDD system can be realized with low
(Continued)

complexity, and the system performance of the FDD system is improved.

18 Claims, 6 Drawing Sheets

(51) Int. Cl.
    *H04L 1/18*     (2006.01)
    *H04L 5/14*     (2006.01)
    *H04W 74/08*     (2009.01)

(56) References Cited

U.S. PATENT DOCUMENTS

| | | |
|---|---|---|
| 2012/0257519 A1 | 10/2012 | Frank et al. |
| 2013/0128826 A1 | 5/2013 | Lin et al. |
| 2013/0163543 A1 * | 6/2013 | Freda ................ H04W 72/0406 370/329 |
| 2013/0242824 A1 | 9/2013 | Lee et al. |
| 2013/0343239 A1 | 12/2013 | Damnjanovic et al. |
| 2015/0078279 A1 * | 3/2015 | Ko ........................ H04W 76/14 370/329 |
| 2016/0057741 A1 * | 2/2016 | Seo ........................ H04W 16/04 370/280 |
| 2017/0019237 A1 * | 1/2017 | Yang ..................... H04L 5/0055 |
| 2017/0027013 A1 * | 1/2017 | Kim ....................... H04W 72/04 |

FOREIGN PATENT DOCUMENTS

| | | |
|---|---|---|
| CN | 102014510 A | 4/2011 |
| CN | 102917328 A | 2/2013 |
| WO | 2013/162333 A1 | 10/2013 |

OTHER PUBLICATIONS

Ohinese Office Action dated Jan. 29, 2019, issued in Chinese Patent Application No. 20140171095.3.

* cited by examiner

METHOD AND APPARATUS FOR IMPLEMENTING UPLINK TRANSMISSION IN FLEXIBLE FREQUENCY DIVISION DUPLEX SYSTEM

CROSS-REFERENCE TO RELATED APPLICATION(S)

This application is a U.S. National Stage application under 35 U.S.C. § 371 of an International application filed on Apr. 23, 2015 and assigned application number PCT/KR2015/004040, which claimed the benefit of a Chinese patent application filed on Apr. 25, 2014 in the State Intellectual Property Office and assigned Serial number 201410171095.3, the entire disclosure of which is hereby incorporated by reference.

TECHNICAL FIELD

The present invention relates to wireless communication systems, and especially to a method and apparatus for implementing uplink transmission in a flexible frequency division duplex (FDD) system.

BACKGROUND

The long term evolution (LTE) technology supports two kinds of duplex methods: frequency division duplex (FDD) and time division duplex (TDD). In a LTE system, transmission from a base station to a user equipment (UE) is called downlink and transmission from the UE to the base station is called uplink.

A FDD system includes two carriers, called uplink carrier and downlink carrier respectively, in which the uplink carrier is used for uplink transmission and the downlink carrier is used for downlink transmission. The uplink carrier and the downlink carrier have a same system frame structure consisting of 10 uplink sub-frames or downlink sub-frames each of which has a time length of 1 millisecond (ms), as shown in FIG. 1.

FIG. 2 is a schematic diagram illustrating a frame structure of a LTE TDD system. The length of each radio frame is 10 ms, and each radio frame is equally divided into two half-frames with a length of 5 ms each. Each half-frame contains 8 time slots with a length of 0.5 ms and 3 special fields. The 3 special fields have a total length of 1 ms. The 3 special fields are respectively downlink pilot time slot (DwPTS), guard period (GP), and uplink pilot time slot (UpPTS). Each sub-frame consists of two consecutive time slots. Based on the frame structure shown in FIG. 2, 10 sub-frames are shared for uplink and downlink within every 10 ms, and each sub-frame is either configured for uplink or is configured for downlink. A sub-frame that is configured for uplink is called an uplink sub-frame, and a sub-frame that is configured for downlink is called a downlink sub-frame. In the TDD system, 7 uplink/downlink (UL/DL) configurations are supported. As shown in Table 1, D represents a downlink sub-frame, U represents an uplink sub-frame, and S represents a special sub-frame that contains 3 special fields.

TABLE 1

| Reference Configuration Number | Switch Point Period | Sub-frame Index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

The LTE system supports a hybrid automatic repeat request (HARQ) mechanism, and the basic principle of the HARQ mechanism is that a base station allocates uplink resources for a UE; the UE uses the uplink resources to send uplink data to the base station; and the base station receives the uplink data and sends HARQ indicator information to the UE, and the UE performs retransmission of the uplink data according to the indicator information. Specifically, the UE uses a physical uplink shared channel (PUSCH) to bear the uplink data, the base station uses a(n) (enhanced) physical downlink control channel ((E) PDCCH) to bear scheduling and control information of the PUSCH, i.e., uplink grant (UL Grant), and the base station uses a physical hybrid-ARQ indicator channel (PHICH) to bear the HARQ indicator information. In the above procedure, a timing position of a transmission and a timing position of a subsequent retransmission on the PUSCH are determined based on pre-configured timing relations which include a timing relation of uplink grant to PUSCH, a timing relation of PHICH to PUSCH, and a timing relation of PUSCH to PHICH. These three timing relations are all called synchronous HARQ timing relation of PUSCH in the following.

For the timing relation of uplink grant/PHICH to PUSCH, assuming that the UE receives uplink grant or PHICH in downlink sub-frame n (n being a sub-frame index number, similarly hereafter), then the uplink grant or the PHICH is used to control PUSCH in uplink sub-frame n+k. In a FDD system, the value of k is 4, and in a TDD system, the value of k is decided by uplink reference TDD uplink/downlink configurations (UL-reference TDD UL/DL configurations) of a cell, as shown in Table 2.

TABLE 2

| Reference Configuration Number | Sub-frame Index n | | | | | | | | | |
|---|---|---|---|---|---|---|---|---|---|---|
| | 0 | 1 | 2 | 3 | 4 | 5 | 6 | 7 | 8 | 9 |
| 0 | 4,7 | 6,7 | | | | 4,7 | 6,7 | | | |
| 1 | | 6 | | | 4 | | 6 | | | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | | 7 | 7 | | | 7 | 7 | | | 5 |

For the timing relation of PUSCH to PHICH, when the UE receives PHICH in downlink sub-frame n, the PHICH indicates the HARQ-ACK information of PUSCH in uplink sub-frame n−h, where for the FDD system, the value of h is 4, and for the TDD system, the value of h is decided by the UL-reference TDD UL/DL configurations of the cell, as shown in Table 3.

TABLE 3

| Reference Configuration Number | Sub-frame Index n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | | 7 | 4 | | |
| 1 | | 4 | | | 6 | | 4 | | | 6 |
| 2 | | | 6 | | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

According to a duplex mode of the cell, if the duplex mode is TDD, then a synchronous HARQ timing relation of PUSCH adopted by the cell can be determined according to the reference UL/DL configurations of the cell, so as to realize synchronous transmission of PUSCH according to the synchronous HARQ timing relation of PUSCH.

As seen from the above the description, compared to the TDD system, the HARQ working mechanism of the FDD system is very simple, which is a big advantage of the FDD system. However, compared to the TDD system, there is a very obvious disadvantage in the FDD system. That is, UL/DL resource allocation is not that flexible. Because the TDD system may change the UL/DL resource allocation to make the ratio of uplink frames to downlink frames be adapted to the ratio of uplink services to downlink services, but the bandwidth of UL/DL carriers cannot be changed flexibly in the FDD system. With booming of mobile internet, the habits of mobile users have changed a lot. Generally, the amount of downlink services is much larger than the amount of uplink services in a cell, and in some circumstances, the ratio of uplink services to downlink services in a cell changes dynamically.

To adapt to the above change, flexible FDD technologies are paid more and more attention to. The flexible FDD technology may convert a part of uplink sub-frames on a FDD uplink carrier into downlink sub-frames, so as to flexibly change the ratio of uplink sub-frames to downlink sub-frames on the uplink carrier of a FDD system to adapt to the ratio of uplink services to downlink services of a current cell. It should be noted that currently sub-frames on an uplink carrier in a FDD system are all used for uplink transmission. That is, they are all uplink sub-frames. Since the flexible FDD technology introduces downlink sub-frames into uplink carriers, the technology may cause new problems for uplink transmission in a FDD system, e.g., how to realize transmission on PUSCH of a flexible FDD supported UE (FFUE), how to be compatible with uplink transmission of a backward UE, etc.

Obviously, the flexible FDD technology will cause new problems for the uplink transmission, but currently there is no solution to solve the problems yet.

SUMMARY

An object of the present invention is to solve at least one of the problems in the traditional art, and especial provide a method and apparatus for implementing uplink transmission in a flexible FDD system, by which, uplink transmission in the FDD system can be realized with low complexity, and the system performance of the FDD system is improved.

The method for implementing uplink transmission in the flexible frequency division duplex (FDD) system includes: a flexible FDD supported user equipment (FFUE) receiving signaling from an evolved node B (eNB), obtaining an uplink carrier configuration of a FDD cell configured to indicate sub-frame distribution on an uplink carrier of the FDD cell; the FFUE detecting uplink grant according to the uplink carrier configuration, and performing sending of physical uplink shared channel (PUSCH) data and/or detection of physical hybrid automatic repeat request indicator channel (PHICH) data according to the detected uplink grant.

Preferably, the uplink carrier configuration includes one of or any combination of the following: a configuration of a physical random access channel (PRACH) sub-frame and a sounding reference signal (SRS) sub-frame of the cell, an indicator of whether the uplink carrier working in a flexible mode or not, positions and periods of uplink sub-frames on the uplink carrier, positions of uplink sub-frames that belong to an uplink sub-frame set having a period of 8 ms, positions of uplink sub-frames that belong to an uplink sub-frame set having a period of 10 ms, positions of fixed uplink sub-frames and flexible sub-frames; and uplink/downlink direction indicators of the flexible sub-frames.

Preferably, after the signaling is received, an uplink working mode indicator corresponding to the FFUE is further obtained, in which the uplink working mode indicator includes a round trip time (RTT) period of PUSCH transmission and/or a set of working uplink sub-frames of the FFUE; and the operation of detecting the uplink grant according to the uplink working mode indicator is further performed.

Preferably, when it is determined that the uplink/downlink sub-frame distribution is configured according to 10 ms or N*10 ms on the uplink carrier of the FDD cell, detecting the uplink grant and performing sending of the PUSCH data and/or the detection of the PHICH data include: keeping uplink scheduling and a hybrid automatic repeat request (HARQ) timing relation on the uplink carrier of the FDD cell which works in the flexible FDD mode being 10 ms RTT unchanged; for uplink sub-frame n on the uplink carrier, the FFUE detecting uplink grant of the uplink sub-frame n in downlink sub-frame n−x on a downlink carrier of the FDD cell, detecting PHICH data dedicated for PUSCH data in the sub-frame n in downlink sub-frame n+y on the downlink carrier, and performing retransmission of the PUSCH data in the uplink sub-frame n in uplink sub-frame n+10 on the uplink carrier, where n is an integer, and where N, x, and y are preset positive integers, and x+y=10.

Preferably, when the uplink carrier configuration includes the positions of the uplink sub-frames that belong to the uplink sub-frame set having the period of 8 ms and the positions of the uplink sub-frames that belong to the uplink sub-frame set having the period of 10 ms, detecting the uplink grant and performing sending of the PUSCH data and/or detection of the PHICH data includes: if it is determined that the FFUE works in the uplink sub-frame set having the period of 8 ms, then for any uplink sub-frame n that belongs to the uplink sub-frame set having the period of 8 ms, the FFUE detecting the uplink grant of the uplink sub-frame n in downlink sub-frame n−4 on the downlink carrier of the FDD cell, detecting PHICH data dedicated for the PUSCH data in the uplink sub-frame n in downlink sub-frame n+4 on the downlink carrier, and performing the retransmission of the PUSCH data in the uplink sub-frame n in uplink sub-frame n+8 on the uplink carrier of the FDD cell; and if it is determined that the FFUE works in the uplink sub-frame set having the period of 10 ms, then for any uplink sub-frame n that belongs to the uplink sub-frame set having the period of 10 ms, the FFUE detecting the uplink grant of the uplink sub-frame n in downlink sub-frame n−x on the downlink carrier of the FDD cell, detecting PHICH data dedicated for the PUSCH data in the uplink sub-frame n in the downlink sub-frame n+y on the downlink carrier, and performing the retransmission of the PUSCH data in the uplink sub-frame n in the uplink sub-frame n+10 on the uplink carrier of the FDD cell; where x and y are preset positive integers, and x+y=10.

Preferably, the FFUE working in the uplink sub-frame set having the period of 8 ms or 10 ms is determined according to the uplink working mode indicator or is preset.

Preferably, when the uplink carrier configuration includes the positions of the fixed uplink sub-frames and flexible sub-frames, the method further includes: for any sub-frame n that is located in a position of a flexible sub-frame on the uplink carrier of the FDD cell, if the FFUE detects uplink grant corresponding to the any sub-frame n, then the FFUE not detecting downlink grant corresponding to the any sub-frame n on the downlink carrier of the FDD cell; and if the FFUE has not detected the uplink grant corresponding to the any sub-frame n, then the FFUE detecting the downlink grant corresponding to the any sub-frame n on the downlink carrier of the FDD cell.

Preferably, when the uplink carrier configuration includes the positions of the fixed uplink sub-frames and flexible sub-frames, detecting the uplink grant and performing the sending of the PUSCH data include: for any sub-frame n on the uplink carrier of the FDD cell that is located in a position of a fixed uplink sub-frame or a flexible sub-frame, the FFUE detecting uplink grant of the any sub-frame n in downlink sub-frame n−x on the downlink carrier of the FDD cell, detecting PHICH data dedicated for PUSCH data in the any sub-frame n in downlink sub-frame n+y on the downlink carrier, and performing retransmission of the PUSCH data in the any sub-frame n in uplink sub-frame n+10 on the uplink carrier; x and y are preset positive integers, and x+y=10; or for any sub-frame n on the uplink carrier of the FDD cell that is located in the position of the fixed uplink sub-frame or the flexible sub-frame, the FFUE detecting the uplink grant of the any sub-frame n in downlink sub-frame n−4 on the downlink carrier of the FDD cell, detecting the PHICH data dedicated for the PUSCH data in the any sub-frame n in downlink sub-frame n+4 on the downlink carrier, and performing retransmission of the PUSCH data in the any sub-frame n in uplink sub-frame n+8 on the uplink carrier.

Preferably, when the uplink carrier configuration includes the positions of the fixed uplink sub-frames and flexible sub-frames, detecting the uplink grant and performing the sending of the PUSCH data include: for any sub-frame n on the uplink carrier of the FDD cell that is located in a position of a fixed uplink sub-frame or flexible sub-frame, the FFUE detecting uplink grant of the sub-frame n in downlink sub-frame n−z on the downlink carrier of the FDD cell; and if the uplink grant containing a HARQ procedure number of a scheduled PUSCH is detected, then the FFUE newly transmitting or retransmitting PUSCH corresponding to the HARQ procedure number in the sub-frame n on the uplink carrier, where z is a preset positive integer.

Preferably, it is determined according to the uplink carrier configuration that the uplink/downlink sub-frame distribution is configured according to Tms on the uplink carrier of the FDD cell, detecting the uplink grant and performing sending of the PUSCH data and/or the detection of the PHICH data include: for an uplink sub-frame n on the uplink carrier, the FFUE detecting uplink grant of the uplink sub-frame n in downlink sub-frame n−z of the downlink carrier of the FDD cell, and detecting PHICH data dedicated for PUSCH data in the uplink sub-frame n in downlink sub-frame n+z on the downlink carrier, and performing retransmission of the PUSCH data in the uplink sub-frame n in uplink sub-frame n+8 on the uplink carrier; where z is a preset positive integer, and T is 8 or 10.

A terminal device includes: a configuration obtaining unit, a sending and detection unit; in which the configuration obtaining unit is configured to receive signaling of a base station eNB, and obtain an uplink carrier configuration of a FDD cell configured to indicate sub-frame distribution on an uplink carrier of the FDD cell; and the sending and detection unit is configured to detect UL grant according to the uplink carrier configuration obtained by the configuration obtaining unit, and perform sending of PUSCH data and/or detection of PHICH data.

In the technical solution of the present invention, the FFUE receives signaling from the eNB, obtains the uplink carrier configuration, detects the uplink grant according to the configuration information, and performs sending of the PUSCH data and/or the detection of the PHICH data. In more detail, the PUSCH transmission may be performed by way of synchronous HARQ of 8 ms, synchronous HARQ of 10 ms, or asynchronous hybrid automatic repeat request (HARQ). According to the solution provided by the present invention, uplink transmission in the FDD system can be realized with low complexity, and the system performance of the FDD system is improved.

DETAILED DESCRIPTION

The objects, technical solutions and advantages of the present invention will be better understood after the present application is further described with reference to the drawings.

In a traditional FDD system, each cell contains two carriers, respectively for uplink transmission and downlink transmission. Since generally the bandwidths of the uplink carrier and of the downlink carrier are equal, and once the bandwidths of the uplink carrier and the downlink carrier are determined, they cannot be changed flexibly, which makes the FDD system unable to adapt to a feature that nowadays the amount of downlink services is larger than the amount of uplink services and the ratio of the amount of downlink services to the amount of uplink services may change dynamically. To solve the above conflict, flexible FDD technologies emerge as required. In a flexible FDD system, a part of uplink sub-frames may be converted into downlink sub-frames, so as to flexibly change the ratio of uplink sub-frames to downlink sub-frames on an uplink carrier of the FDD system to adapt to the ratio of uplink services to downlink services of a current cell.

Figure 1:
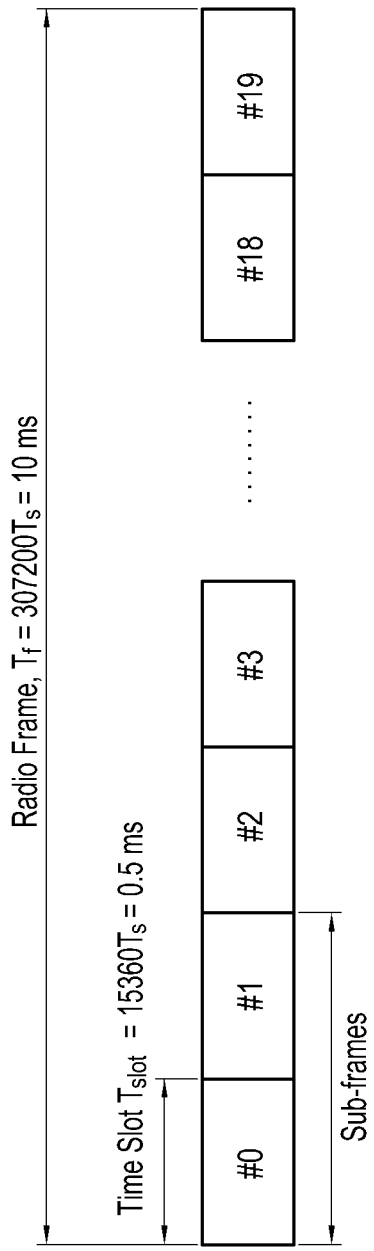
FIG. 1 is a schematic diagram of a frame structure in a FDD system.
Figure 2:
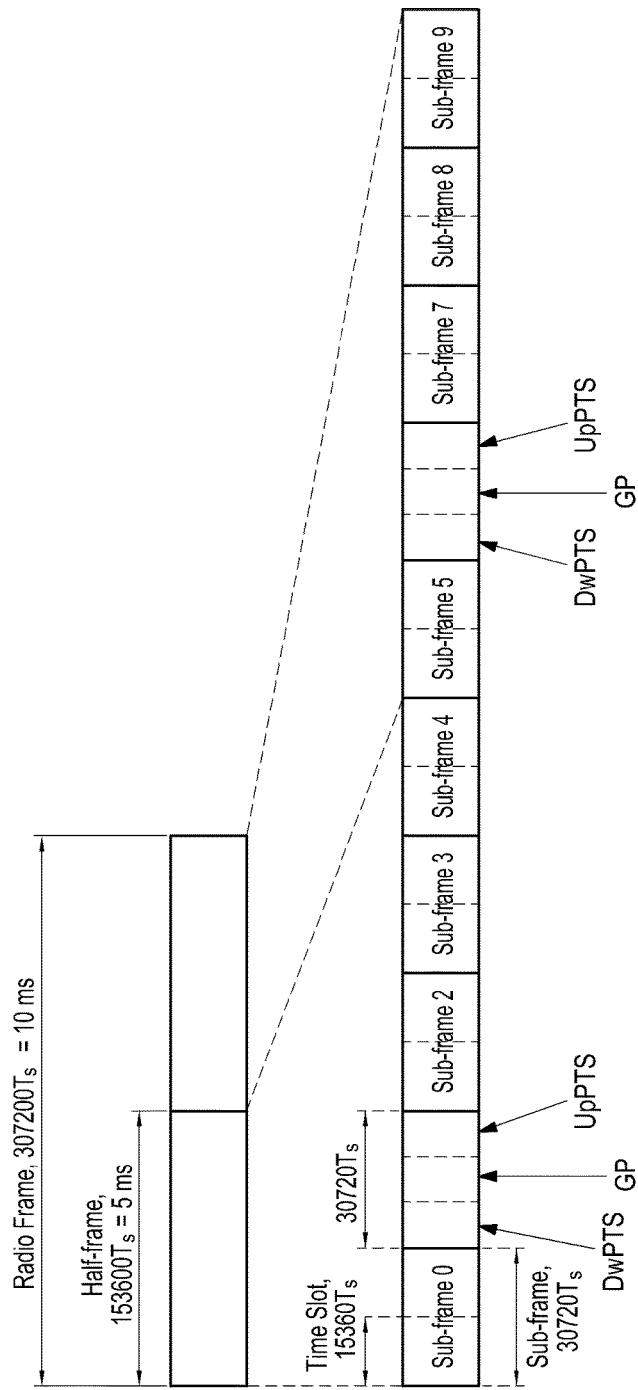
FIG. 2 is a schematic diagram of a frame structure in a TDD system.
Figure 3:
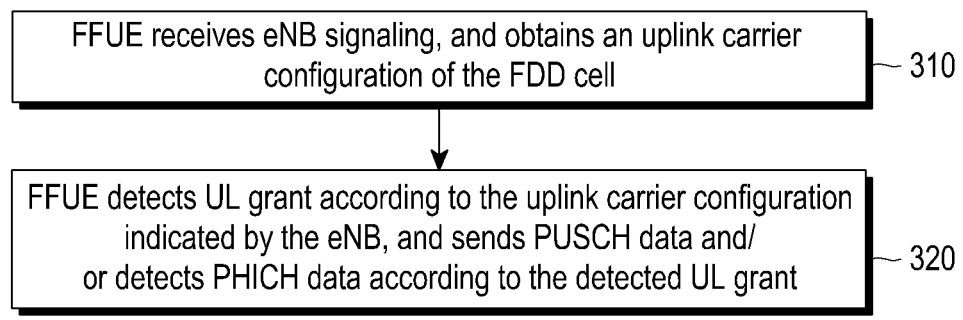
FIG. 3 is a basic flow chart of an uplink transmission method according to the present invention.

To solve the problems in uplink transmission of flexible FDD systems, a method for implementing uplink transmission in a flexible FDD system is provided according to the present invention. As shown in FIG. 3, the method includes the following steps.

At step 310, a FFUE receives signaling from an eNB, obtains an uplink carrier configuration of a FDD cell used to indicate sub-frame distribution on an uplink carrier of the FDD cell.

The uplink carrier configuration includes one or more piece of the following information:

1. A configuration of a physical random access channel (PRACH) sub-frame and a sounding reference signal (SRS) sub-frame of the cell;
2. An indicator of whether the uplink carrier working in a flexible mode or not;
3. Positions and periods of uplink sub-frames on the uplink carrier;
4. Positions of uplink sub-frames that belong to an uplink sub-frame set having a period of 8 ms;
5. Positions of uplink sub-frames that belong to an uplink sub-frame set having a period of 10 ms;
6. Positions of fixed uplink sub-frames and flexible sub-frames; and
7. UL/DL direction indicators of the flexible sub-frames.

Figure 4:
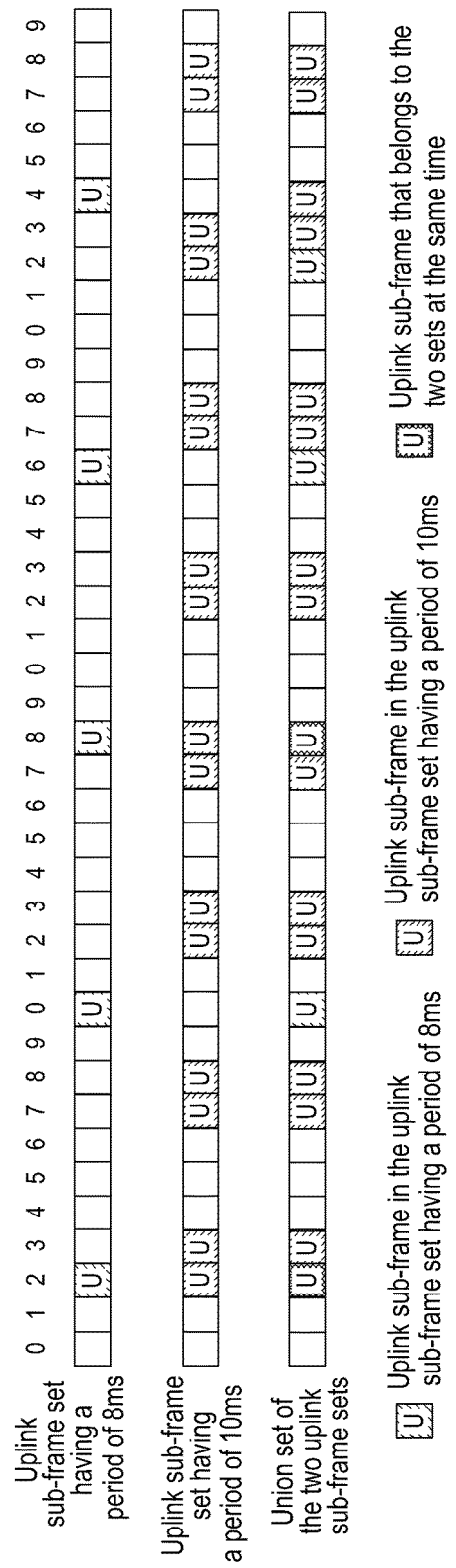
FIG. 4 is a schematic diagram of two uplink sub-frame sets having periods of 8 ms and 10 ms respectively.

In the items 4 and 5, there may be intersection between the uplink sub-frame set having the period of 8 ms and the uplink sub-frame set having the period of 10 ms, as shown in FIG. 4. The flexible sub-frames in the items 6 and 7 refer to sub-frames whose UL/DL directions may be changed dynamically.

The above uplink carrier configuration may be used to indicate sub-frame distribution on the uplink carrier in the flexible FDD system. In the item 7, the UL/DL direction indicators of the flexible sub-frames may not be explicit indicator information, but implicitly indicate the UL/DL directions of the flexible sub-frames by a scheduling approach targeted for the flexible sub-frames (uplink scheduling or downlink scheduling). For example, if the FFUE receives UL grant targeted for a flexible sub-frame, then the FFUE considers that the flexible sub-frame is an uplink sub-frame, or otherwise, if the FFUE detects DL grant targeted for a flexible sub-frame, then the FFUE considers that the flexible sub-frame is a downlink sub-frame or is a special sub-frame.

Besides of the above uplink carrier configuration, further preferably, an indicator dedicated for an uplink working mode of the FFUE may be contained in eNB signaling. If the indicator dedicated for the uplink working mode of the FFUE is contained, then the indicator information is used to indicate one or more pieces of the following information:

1. A round trip time (RTT) period of PUSCH transmission; and
2. A set of working uplink sub-frames of the FFUE.

At step 320, the FFUE detects UL grant according to the uplink carrier configuration indicated by eNB, sends physical uplink shared channel (PUSCH) data and/or detects physical hybrid automatic repeat request indicator channel (PHICH) data according to the UL grant.

The FFUE performs the detection of the UL grant according to the sub-frame distribution on the uplink carrier indicated by the uplink carrier configuration, and performs sending of the PUSCH data and/or detection of the PHICH data.

To facilitate understanding the present application, the above technical solution will be further described in detail as follows by way of interactions between devices in combination of detailed implementations:

Embodiment 1

In the present embodiment, on the uplink carrier of the FDD cell which works in the flexible FDD mode, the FFUE determines an UL/DL sub-frame distribution configuration period T. Specifically, corresponding information, i.e., positions and periods of the uplink sub-frames on the uplink carrier, may be carried in the uplink carrier configuration of forgoing item 3. For example, the UL/DL sub-frame distribution may be configured by way of T being equal to 10 ms. The position information of the uplink sub-frames may be carried in the following several ways. In the period of 10 ms, the number of uplink sub-frames may be 1~10, and sub-frame index numbers of the uplink sub-frames may be carried directly. Or, the number of the uplink sub-frames may be limited to some specific values, e.g., 1, 2, 3, 4, 5, 6, 8, or 10, so that the UL/DL sub-frame distribution on the uplink carrier may be indicated by 3 bits. Or on the uplink carrier of the FDD cell which works in the flexible FDD mode, the UL/DL sub-frame distribution may be configured by way of T being an integral multiple of 10 ms, e.g., T being 40 ms, which is a least common multiple of 8 ms RTT and 10 ms frame period of backward LTE FDD, and is equal to a configuration period of almost blank sub-frames (ABSF). The UL/DL sub-frame distribution within T being 40 ms may be indicated by way of bit mapping, e.g., 40 bits being used to indicate by way of one-to-one correspondence. Or some available sub-frame patterns within 40 ms may be defined, so as to low the costs by only indicating an index of a sub-frame pattern that is to be used. The UL/DL sub-frame distribution on the uplink carrier may be configured semi-statically or dynamically.

On the uplink carrier of the FDD cell which works in the flexible FDD mode, the UL/DL sub-frame distribution may be changed semi-statically or dynamically, assuming that the PUSCH transmission thereof is still based on a synchronous HARQ mechanism. According to the present application, uplink scheduling and a synchronous HARQ timing relation of 10 ms RTT are applied to all the sub-frames on the uplink carrier, independent of actual UL/DL sub-frame distribution on the uplink carrier. Specifically, for uplink sub-frame n on the uplink carrier, the FFUE detects UL grant dedicated for the uplink sub-frame n in downlink sub-frame n−x on the downlink carrier, detects PHICH dedicated for PUSCH in sub-frame n in downlink sub-frame n+y on the downlink carrier, and performs non-self-adaptive or self-adaptive retransmission of the PUSCH in the sub-frame n, where x and y are all positive integers, and x+y=10, e.g., x=4, y=6. That is, on the uplink carrier of the FDD cell which works in the flexible FDD mode, the RTT of synchronous HARQ transmission of PUSCH is equal to 10 ms.

The advantages of the above uplink transmission are that, for example, assuming that the downlink carrier is all downlink sub-frames, the PUSCH transmission on the uplink carrier is scheduled by (E)PDCCH on the downlink carrier, and the HARQ timing relation of 10 ms RTT is applied, and assuming that the period of the UL/DL sub-frame distribution is also 10 ms, after the PUSCH is scheduled, what is in a PUSCH retransmission position is guaranteed to be an uplink sub-frame as long as the UL/DL sub-frame distribution on the uplink carrier keeps unchanged (no matter what detailed UL/DL configuration is adopted), which simplifies the complexity of eNB scheduler, and improves the PUSCH transmission performance.

Herein, in the circumstance that the downlink carrier is totally used for uplink transmission, to work coordinately with other circumstances where other UL/DL sub-frame distribution is adopted on the uplink carrier, the scheduling/HARQ timing relation of 8 ms RTT in the backward LTE FDD system will not be used any more. That is, when the method of the present embodiment is used, the uplink scheduling and the HARQ timing relation on the uplink carrier of the FDD cell which works in the flexible FDD mode keep being 10 ms RTT all the time, so when the UL/DL sub-frame distribution on the uplink carrier is re-configured, confusion of uplink HARQ process adjacent to a border of distribution changes may be avoid.

Till now, the description of the present embodiment is completed. Since the traditional PRACH and SRS are also configured at a period of 10 ms, according to the method of the present embodiment, eNB can configure the PRACH and SRS of the cell into the uplink sub-frames, which can avoid configuring them into the downlink sub-frames on the uplink carrier, so as to be compatible with the PRACH and SRS configurations in the traditional LTE system.

Embodiment 2

In the present embodiment, the uplink sub-frames on the uplink carrier of the FDD cell that works in the flexible FDD mode are divided into two uplink sub-frame sets, namely, an uplink sub-frame set having a period of 8 ms and a downlink sub-frame set having a period of 10 ms. If sub-frame n belongs to the uplink sub-frame set having the period of 8 ms or belongs to the uplink sub-frame set having the period of 10 ms, then sub-frame n+8 or n+10 also belongs to that uplink sub-frame set. The two uplink sub-frame sets may be notified to the FFUE by way of the item 4 and the item 5 in the uplink carrier configuration mentioned above. The number and the positions of the sub-frames contained in the above two sets can be change. Methods to indicate the above two sub-frame sets and a time interval to change the sets will not be limited in the present invention, and a sub-frame beyond a union set of the above two sub-frame sets is a downlink sub-frame or a special sub-frame. The FFUE may statically, semi-statically, or dynamically work in the two uplink sub-frame sets, or the FFUE may work in the two uplink sub-frames at the same time. Which sub-frame set in which the FFUE works may be notified to the FFUE by the uplink working mode indicator dedicated for the FFUE, or be specified in a preset way (e.g., a backward UE working in the uplink sub-frame set having the period of 8 ms, and a FFUE working in the uplink sub-frame set having the period of 10 ms).

Figure 5:
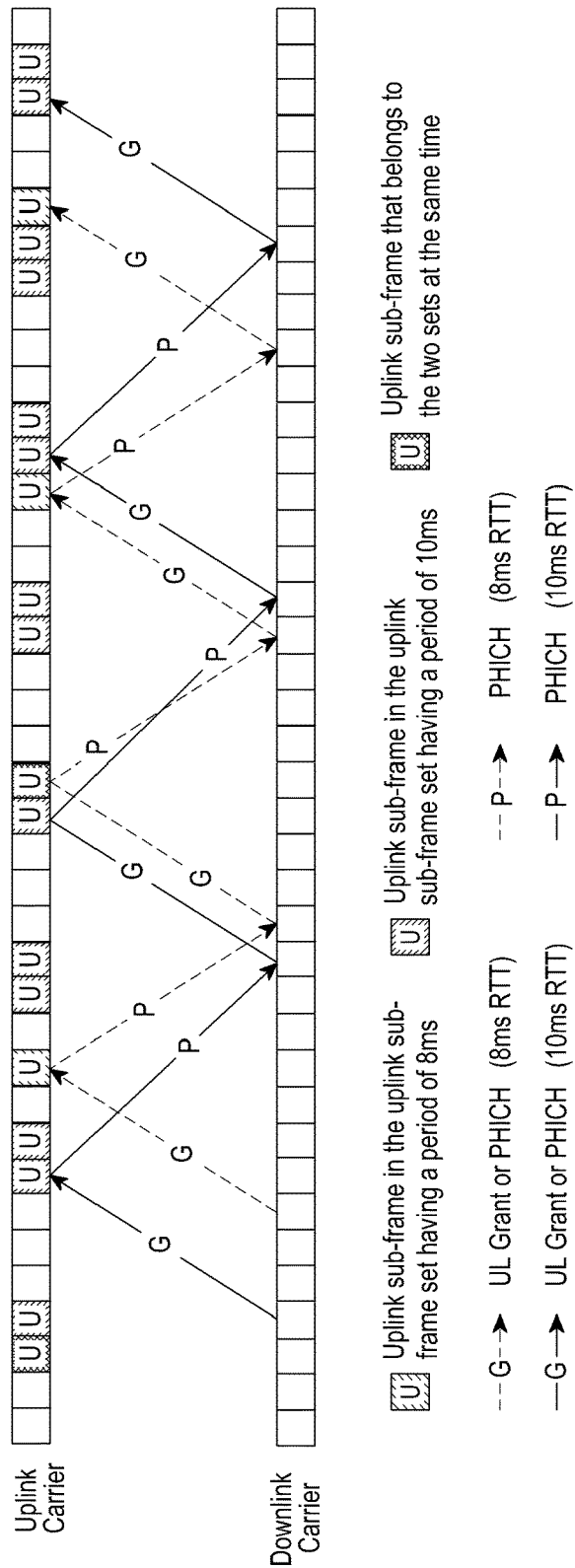
FIG. 5 is a schematic diagram of uplink timing relations of 8 ms RTT and 10 ms RTT.

If the FFUE in the flexible FDD system, according to the uplink working mode indicator indicated by the eNB, or according to definition in a protocol, statically or semi-statically works in the uplink sub-frame set having the period of 8 ms, then the FFUE performs uplink transmission according to the synchronous HARQ timing relation of PUSCH that has 8 ms RTT. Specifically, for uplink sub-frame n in the uplink sub-frame set having the period of 8 ms, the FFUE detects UL grant dedicated for the uplink sub-frame n in downlink sub-frame n−4 on the downlink carrier, detects PHICH dedicated for PUSCH in the sub-frame n in downlink sub-frame n+4 on the downlink carrier, and performs non-self-adaptive or self-adaptive retransmission of PUSCH in the sub-frame n in sub-frame n+8 on the uplink carrier, as shown in FIG. 5.

If the FFUE, according to the uplink working mode indicator indicated by the eNB, or according to definition in the protocol, statically or semi-statically works in the uplink sub-frame set having the period of 10 ms, then the FFUE performs uplink transmission according to the synchronous HARQ timing relation of PUSCH having 10 ms RTT. Specifically, for uplink sub-frame n in the uplink sub-frame set having the period of 10 ms, the FFUE detects UL grant dedicated for the uplink sub-frame n in downlink sub-frame n−x on the downlink carrier, detects PHICH dedicated for PUSCH in the sub-frame n in downlink sub-frame n+y on the downlink carrier, and performs non-self-adaptive or self-adaptive retransmission of PUSCH in the sub-frame n in sub-frame n+10 on the uplink carrier, where both x and y are positive integers, and x+y=10, e.g., x=4, y=6, as shown in FIG. 5.

Till now, the description of the present embodiment is completed. According to the method of the present embodiment, the eNB may limit the PUSCH transmission of the backward UE within the uplink sub-frame set of 8 ms. Meanwhile, similarly with that in embodiment 1, the eNB can configure the PRACH and SRS of the cell into the uplink sub-frames in the sub-frame set of 10 ms, which can be compatible with the PRACH and SRS configurations in the traditional LTE systems. Besides of this, when a part of FFUEs are scheduled to the uplink sub-frame set of 10 ms according to the PUSCH timing relation having the 10 ms RTT, the uplink resources in the set can be fully utilized.

Embodiment 3

In the present embodiment, sub-frames on the uplink carrier are divided into fixed uplink sub-frames, flexible sub-frames, and/or other types of sub-frames, in which other types of sub-frames include fixed downlink sub-frames and special sub-frames, and other types of sub-frames may not be present. The detailed distribution of the fixed downlink sub-frames and the flexible sub-frames on the uplink carrier may be notified to the FFUE by the item 6 in the uplink carrier configuration mentioned above, and the FFUE obtains positions of the fixed uplink sub-frames, flexible sub-frames, and/or other types of sub-frames by receiving the uplink carrier configuration of the flexible FDD cell. For any sub-frame n on the uplink carrier, where the sub-frame n may be a fixed uplink sub-frame or may be a flexible sub-frame, the FFUE performs the uplink transmission according to the synchronous HARQ timing relation of PUSCH having 8 ms RTT or 10 ms RTT as in Embodiment 2.

Preferably, if the sub-frame n on the uplink carrier is a flexible sub-frame, and the FFUE detects UL grant dedicated for it, then the FFUE skips detection of DL grant dedicated for the flexible sub-frame n on the uplink carrier in downlink sub-frame n on the downlink carrier. That is, when the UL grant dedicated for the flexible sub-frame n is detected, which indicates that the flexible sub-frame n is used for uplink transmission, then the detection of DL grant dedicated for the flexible sub-frame n will not be performed any more. Otherwise, if the FFUE has not detected the UL grant dedicated for the flexible sub-frame n, then the detection of DL grant dedicated for the flexible sub-frame n in the downlink sub-frame n on the downlink carrier will be performed. That is, through the UL grant/DL grant dedicated for the flexible sub-frame n, the FFUE is implicitly notified that the current transmission direction of the flexible sub-frame n is uplink/downlink. That is, the item 7 in the above uplink configuration carrier may be an implicit notification, specifically may be UL grant or DL grant.

Till now, the description of the present embodiment is completed. By way of the present embodiment, the eNB may decide the direction of a flexible sub-frame according to a current UL/DL transmission requirement, and when an uplink transmission requirement is present in a certain flexible sub-frame, the flexible sub-frame then may be indicated to be uplink (e.g., through UL grant), or otherwise, if no uplink transmission is present in the sub-frame, then the sub-frame may be used for downlink transmission. By way of the method, the complexity of implementing the FFUE can be reduced, and the flexibility of operating the flexible FDD cell is high.

Embodiment 4

In the present embodiment, the sub-frames on the uplink carrier are divided into fixed uplink sub-frames, flexible sub-frames, and/or other types of sub-frames, in which other types of sub-frames include fixed downlink sub-frames and special sub-frames, and the flexible sub-frames and other types of sub-frames may not be present. Similarly to Embodiment 3, the positions of the fixed uplink sub-frames and flexible sub-frames may be notified to the FFUE through the item 6 in the above uplink carrier configuration, and the FFUE obtains the positions of the fixed uplink sub-frames and the flexible sub-frames (if the flexible sub-frames are present) on the uplink carrier by receiving the uplink carrier configuration of the eNB.

For any sub-frame n in the fixed uplink sub-frames or in the flexible sub-frames, the FFUE detects UL grant dedicated for the sub-frame n in downlink sub-frame n−z on the downlink carrier, where z is a positive integer defined by existing standards, e.g., z=4. In the UL grant, besides of the information defined by existing standards, a HARQ procedure number of scheduled PUSCH in the sub-frame n should also be contained, and the FFUE transmits newly or retransmits PUSCH corresponding to the HARQ procedure number in sub-frame n on the uplink carrier.

Meanwhile, for the situation in the present embodiment, similarly to that in Embodiment 3, the current transmission direction of a flexible sub-frame may be implicitly notified to the FFUE by UL grant or by DL grant.

Till now, the description of the present embodiment is completed. By way of the method, the eNB avoids the limitation of the PUSCH RTT period, and performs uplink transmission by using any available uplink sub-frame on the uplink carrier.

Embodiment 5

In the present embodiment, on the uplink carrier of the FDD cell working in the flexible FDD mode, the FFUE may determines the UL/DL sub-frame distribution configuration period T according to the uplink carrier configuration indicated by the eNB. Specifically, corresponding information, i.e., the positions and periods of uplink sub-frames on the uplink carrier, may be carried by item 3 in the above uplink carrier configuration. T may be 8 ms or 10 ms. When a period of 8 ms is used to configure the UL/DL sub-frame distribution, the position information of the uplink sub-frames may be carried in the following several ways. For example, in the period of 8 ms, the number of uplink sub-frames may be 1~8, and the sub-frame index numbers of the uplink sub-frames may be carried directly. Or the number of uplink sub-frames may be limited to some specific values, e.g., 1, 2, 3, 4, 5, 6, 7, or 8, so that the UL/DL sub-frame distribution on the uplink carrier may be indicated by 3 bits. OR on the uplink carrier of the FDD cell working in the flexible FDD mode, the UL/DL sub-frame distribution may be configured according to the period of 10 ms. When the period of 8 ms is used to configure the UL/DL sub-frame distribution, the position information of the uplink sub-frames may be carried in the following several ways. For example, in the period of 10 ms, the number of the uplink sub-frames may be 1~10, and the sub-frame index numbers of the uplink sub-frames may be carried directly. Or the number of uplink sub-frames in the period of 10 ms may be limited to some specific values, e.g., 1, 2, 3, 4, 5, 6, 8, or 10, so that the UL/DL sub-frame distribution on the uplink carrier may be indicated by 3 bits. The UL/DL sub-frame distribution on the uplink carrier may be semi-statically or dynamically configured.

On the uplink carrier of the FDD cell working in the flexible FDD mode, the UL/DL sub-frame distribution thereof may be changed semi-statically or dynamically, assuming that the PUSCH transmission thereof is still based on the synchronous HARQ mechanism. It is proposed in the present invention that independent of the actual UL/DL sub-frame distribution on the uplink carrier, the uplink sub-frame n on the uplink carrier all uses the synchronous HARQ timing relation of 8 ms RTT. Specifically, for uplink sub-frame n on the uplink carrier, the FFUE detects UL grant dedicated for the uplink sub-frame n in downlink sub-frame n−z on the downlink carrier, detects PHICH dedicated for PUSCH in the sub-frame n in downlink sub-frame n+z on the downlink carrier, and performs non-self-adaptive or self-adaptive retransmission of PUSCH in the sub-frame n in sub-frame n+8 on the uplink carrier. Z is a positive integer defined by the standards, e.g., z=4.

Till now, the description of the present embodiment is completed. By way of the method, confusion of uplink HARQ procedure adjacent to the border of the distribution changes may be avoided, and meanwhile, the uplink sub-frame period of 8 ms may be well compatible with the uplink transmission of a backward UE.

Figure 6:
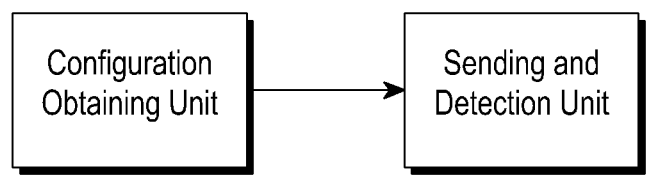
FIG. 6 is a schematic diagram of a basic structure of a user equipment according to the present invention.

Foregoing is the description of the uplink transmission method in the flexible FDD system according to the present invention. The present invention also provides a user equipment which can be used to implement the above transmission methods. FIG. 6 is a schematic diagram illustrating a basic structure of the user equipment. As shown in FIG. 6, the user equipment includes: a configuration obtaining unit, a sending and detection unit.

The configuration obtaining unit is configured to receive signaling of the base station eNB, and obtain an uplink carrier configuration of a FDD cell configured to indicate sub-frame distribution on the uplink carrier of the FDD cell. The sending and detection unit is configured to detect the UL grant according to the uplink carrier configuration obtained by the configuration obtaining unit, and perform sending of the PUSCH data and/or detection of the PHICH data.

With the transmission method and user equipment in the FDD system provided by the present invention, uplink transmission in the FDD system may be realized with low flexibility and the performance of the FDD system is improved.

Those ordinary skilled in the art may understand that all or a part of the steps carried by the above method embodiments may be carried out by a program instructing relevant hardware, and the program may be stored in a computer readable storage medium, and when the program is executed, one of or a combination of the steps in the method embodiments will be included.

Further, the respective functional units in the respective embodiments may be integrated into a processing module, or the respective units may physically separately exist, or two or more units may be integrated into a module. The above integrated module may be implemented by hardware, or by way of software functional modules. If the integrated module is implemented by way of software functional modules and is used or sold as an independent product, it can be stored on a computer readable storage medium.

The storage medium may be a read-only memory device, a magnetic disc, or an optical disc, etc.

It should be understood that the foregoing is only preferred embodiments of the invention and is not intended to limit the present invention. Any modification, equivalent substitution, and improvement without departing from the spirit and principle of this invention should be covered in the protection scope of the invention.

The invention claimed is:

1. A method by a user equipment (UE) in a flexible frequency division duplex (FDD) system, the method comprising:
    obtaining an uplink carrier configuration of a FDD cell, the uplink carrier configuration indicating an uplink/downlink sub-frame distribution on an uplink carrier of the FDD cell;
    detecting an uplink grant based on the uplink carrier configuration comprising positions of fixed uplink sub-frames and flexible sub-frames;
    sending physical uplink shared channel (PUSCH) data and/or detecting physical hybrid automatic repeat request indicator channel (PHICH) data based on the detected uplink grant;
    for a sub-frame n that is located in a position of a flexible sub-frame on the uplink carrier of the FDD cell, if the uplink grant corresponding to the sub-frame n is detected, determining not to detect a downlink grant corresponding to the sub-frame n on a downlink carrier of the FDD cell; and
    if the uplink grant corresponding to the sub-frame n is not detected, determining to detect a downlink grant corresponding to the sub-frame n on the downlink carrier of the FDD cell.

2. The method of claim 1, wherein the uplink carrier configuration further comprises at least one of a configuration of a physical random access channel (PRACH) sub-frame and a sounding reference signal (SRS) sub-frame of the FDD cell, an indicator of whether the uplink carrier is worked in a flexible mode or not, positions and periods of uplink sub-frames on the uplink carrier, positions of uplink sub-frames that belong to an uplink sub-frame set having a period of 8 ms, positions of uplink sub-frames that belong to an uplink sub-frame set having a period of 10 ms, and uplink/downlink direction indicators of the flexible sub-frames.

3. The method of claim 1, further comprising:
    obtaining an uplink working mode indicator corresponding to the UE, wherein the uplink working mode indicator comprises a round trip time (RTT) period of PUSCH transmission and/or a set of working uplink sub-frames of the UE; and
    detecting the uplink grant based on the uplink working mode indicator.

4. The method of claim 1,
    wherein, when the uplink/downlink sub-frame distribution is configured according to 10 ms or N*10 ms on the uplink carrier of the FDD cell, the detecting of the uplink grant and the sending of the PUSCH data and/or the detection of the PHICH data comprise:
        maintaining an uplink scheduling and a hybrid automatic repeat request (HARQ) timing relation on the uplink carrier of the FDD cell which works in a flexible FDD mode as 10 ms RTT; and
        for the sub-frame n on the uplink carrier, detecting the uplink grant of the sub-frame n in a downlink sub-frame n−x on the downlink carrier of the FDD cell, detecting PHICH data dedicated for PUSCH data of the sub-frame n in a downlink sub-frame n+y on the downlink carrier, and performing retransmission of the PUSCH data of the sub-frame n in an uplink sub-frame n+10 on the uplink carrier,
    wherein n is an integer, and
    wherein N, x, and y are preset positive integers, and x+y=10.

5. The method of claim 1,
    wherein, when the uplink carrier configuration comprises the positions of the uplink sub-frames that belong to the uplink sub-frame set having the period of 8 ms and the positions of the uplink sub-frames that belong to the uplink sub-frame set having the period of 10 ms, the detecting of the uplink grant and the performing of the sending of the PUSCH data and/or detection of the PHICH data further comprise:
        if the UE works in the uplink sub-frame set having the period of 8 ms is determined, then for sub-frame n that belongs to the uplink sub-frame set having the period of 8 ms,
            detecting the uplink grant of the sub-frame n in downlink sub-frame n−4 on the downlink carrier of the FDD cell,
            detecting PHICH data dedicated for the PUSCH data of the sub-frame n in a downlink sub-frame n+4 on the downlink carrier, and
            performing the retransmission of the PUSCH data of the sub-frame n in an uplink sub-frame n+8 on the uplink carrier of the FDD cell; and
        if the UE works in the uplink sub-frame set having the period of 10 ms is determined, then for the sub-frame n that belongs to the uplink sub-frame set having the period of 10 ms,
            detecting the uplink grant of the sub-frame n in a downlink sub-frame n−x on the downlink carrier of the FDD cell,
            detecting PHICH data dedicated for the PUSCH data of the sub-frame n in a downlink sub-frame n+y on the downlink carrier, and
            performing the retransmission of the PUSCH data of the sub-frame n in an uplink sub-frame n+10 on the uplink carrier of the FDD cell; and
    wherein x and y are preset positive integers, and x+y=10.

6. The method of claim 5, wherein working in the uplink sub-frame set having the period of 8 ms or 10 ms is determined based on the uplink working mode indicator or is preset.

7. The method of claim 2,
    wherein, when the uplink carrier configuration comprises the positions of the fixed uplink sub-frames and flexible sub-frames, the detecting of the uplink grant and the performing of the sending of the PUSCH data comprise:
        for the sub-frame n on the uplink carrier of the FDD cell that is located in a position of a fixed uplink sub-frame or a flexible sub-frame, detecting the uplink grant of the sub-frame n in a downlink sub-frame n−x on the downlink carrier of the FDD cell, detecting PHICH data dedicated for PUSCH data of the sub-frame n in a downlink sub-frame n+y on the downlink carrier, and performing retransmission of the PUSCH data of the sub-frame n in an uplink sub-frame n+10 on the uplink carrier, wherein x and y are preset positive integers, and x+y=10; or for the sub-frame n on the uplink carrier of the FDD cell that is located in the position of the fixed uplink sub-frame or the flexible sub-frame, detecting the uplink grant of the sub-frame n in a downlink sub-frame n−4 on the downlink carrier of the FDD cell, detecting the PHICH data dedicated for the PUSCH data of the sub-frame n in a downlink sub-frame n+4 on the downlink carrier, and performing retransmission of the PUSCH data of the sub-frame n in an uplink sub-frame n+8 on the uplink carrier.

8. The method of claim 2,
wherein, when the uplink carrier configuration comprises the positions of the fixed uplink sub-frames and flexible sub-frames, the detecting of the uplink grant and the performing of the sending of the PUSCH data comprise:
for the sub-frame n on the uplink carrier of the FDD cell that is located in a position of a fixed uplink sub-frame or flexible sub-frame, detecting the uplink grant of the sub-frame n in a downlink sub-frame n−z on a downlink carrier of the FDD cell; and
if the uplink grant containing a HARQ procedure number of a scheduled PUSCH is detected, then newly transmitting or retransmitting PUSCH data corresponding to the HARQ procedure number in the sub-frame n on the uplink carrier, where z is a preset positive integer.

9. The method of claim 1,
wherein, when, according to the uplink carrier configuration that the uplink/downlink sub-frame distribution is configured according to Tms on the uplink carrier of the FDD cell is determined, the detecting of the uplink grant and the performing of the sending of the PUSCH data and/or the detection of the PHICH data comprise:
for the sub-frame n on the uplink carrier, detecting the uplink grant of the sub-frame n in a downlink sub-frame n−z of the downlink carrier of the FDD cell, and
detecting PHICH data dedicated for PUSCH data of the sub-frame n in a downlink sub-frame n+z on the downlink carrier, and performing retransmission of the PUSCH data of the sub-frame n in an uplink sub-frame n+8 on the uplink carrier; where z is a preset positive integer, and T is 8 or 10.

10. A user equipment (UE) in a flexible frequency division duplex (FDD) system, the UE comprising:
a configuration obtaining unit; and
a sending and detection unit;
wherein the configuration obtaining unit is configured to receive signaling of a base station eNB, and obtain an uplink carrier configuration of a FDD cell configured to indicate an uplink/downlink sub-frame distribution on an uplink carrier of the FDD cell, the uplink carrier configuration comprising positions of the fixed uplink sub-frames and flexible sub-frames, and
wherein the sending and detection unit is configured to:
detect an uplink grant based on the uplink carrier configuration obtained by the configuration obtaining unit, send PUSCH data and/or detection of PHICH data,
for sub-frame n that is located in a position of a flexible sub-frame on the uplink carrier of the FDD cell, if the sending and detection unit detects the uplink grant corresponding to the sub-frame n, determine to not detect a downlink grant corresponding to the sub-frame n on a downlink carrier of the FDD cell, and
if the sending and detection unit has not detected the uplink grant corresponding to the sub-frame n, determine to detect a downlink grant corresponding to the sub-frame n on the downlink carrier of the FDD cell.

11. The UE of claim 10, wherein the uplink carrier configuration further comprises one of or any combination of the following: a configuration of a physical random access channel (PRACH) sub-frame and a sounding reference signal (SRS) sub-frame of the FDD cell, an indicator of whether the uplink carrier is worked in a flexible mode or not, positions and periods of uplink sub-frames on the uplink carrier, positions of uplink sub-frames that belong to an uplink sub-frame set having a period of 8 ms, positions of uplink sub-frames that belong to an uplink sub-frame set having a period of 10 ms, and uplink/downlink direction indicators of the flexible sub-frames.

12. The UE of claim 10,
wherein, after receiving the signaling, the UE obtains an uplink working mode indicator corresponding to the UE,
wherein the uplink working mode indicator comprises a round trip time (RTT) period of PUSCH transmission and/or a set of working uplink sub-frames of the UE and
wherein the UE performs the operation of detecting the uplink grant according to the uplink working mode indicator.

13. The UE of claim 10,
wherein, when the uplink/downlink sub-frame distribution is configured according to 10 ms or N*10 ms on the uplink carrier of a FDD cell is determined, the UE detects the uplink grant and performs sending of the PUSCH data and/or the detection of the PHICH data comprise:
wherein the sending and detection unit maintains uplink scheduling and a hybrid automatic repeat request (HARQ) on the uplink carrier of the FDD cell which works in a flexible FDD mode as 10 ms RTT unchanged;
for the sub-frame n on the uplink carrier, wherein the sending and detection unit detects the uplink grant of the sub-frame n in a downlink sub-frame n−x on the downlink carrier of the FDD cell, detecting PHICH data dedicated for PUSCH data of the sub-frame n in a downlink sub-frame n+y on the downlink carrier,
wherein the sending and detection unit performs retransmission of the PUSCH data of the sub-frame n in an uplink sub-frame n+10 on the uplink carrier,
wherein n is an integer, and
wherein N, x, and y are preset positive integers, and x+y=10.

14. The UE of claim 10,
wherein, when the uplink carrier configuration comprises the positions of the uplink sub-frames that belong to the uplink sub-frame set having the period of 8 ms and the positions of the uplink sub-frames that belong to the uplink sub-frame set having the period of 10 ms, the sending and detection unit detects the uplink grant and performs sending of the PUSCH data and/or detection of the PHICH data, wherein, if the UE works in the uplink sub-frame set having the period of 8 ms is determined, then for the sub-frame n that belongs to the uplink sub-frame set having the period of 8 ms, the sending and detection unit detects the uplink grant of the sub-frame n in a downlink sub-frame n−4 on the downlink carrier of the FDD cell, detects PHICH data dedicated for the PUSCH data of the sub-frame n in a downlink sub-frame n+4 on the downlink carrier, and performs the retransmission of the PUSCH data of the sub-frame n in an uplink sub-frame n+8 on the uplink carrier of the FDD cell, and wherein, if the UE works in the uplink sub-frame set having the period of 10 ms is determined, then for the sub-frame n that belongs to the uplink sub-frame set having the period of 10 ms, the sending and detection unit detects the uplink grant of the sub-frame n in a downlink sub-frame n−x on the downlink carrier of the FDD cell, detects PHICH data dedicated for the PUSCH data of the sub-frame n in a downlink sub-frame n+y on the downlink carrier, and performs the retransmission of the PUSCH data of the sub-frame n in an uplink sub-frame n+10 on the uplink carrier of the FDD cell, and wherein x and y are preset positive integers, and x+y=10.

15. The UE of claim 14, wherein the UE works in the uplink sub-frame set having the period of 8 ms or 10 ms is determined according to the uplink working mode indicator or is preset.

16. The UE of claim 11, wherein, when the uplink carrier configuration comprises the positions of the fixed uplink sub-frames and flexible sub-frames, the sending and detection unit detects the uplink grant and performs the sending of the PUSCH data comprise:

for the sub-frame n on the uplink carrier of the FDD cell that is located in a position of a fixed uplink sub-frame or a flexible sub-frame, when the sending and detection unit detects the uplink grant of the sub-frame n of a downlink sub-frame n−x on the downlink carrier of the FDD cell, the sending and detection unit detects PHICH data dedicated for PUSCH data of the sub-frame n in a downlink sub-frame n+y on the downlink carrier, and the sending and detection unit performs retransmission of the PUSCH data of the sub-frame n in an uplink sub-frame n+10 on the uplink carrier, wherein x and y are preset positive integers, and x+y=10; or for the sub-frame n on the uplink carrier of the FDD cell that is located in the position of the fixed uplink sub-frame or the flexible sub-frame, when the sending and detection unit detects the uplink grant of the sub-frame n in a downlink sub-frame n−4 on the downlink carrier of the FDD cell, the sending and detection unit detects the PHICH data dedicated for the PUSCH data of the sub-frame n in a downlink sub-frame n+4 on the downlink carrier, and the sending and detection unit performs retransmission of the PUSCH data of the sub-frame n in an uplink sub-frame n+8 on the uplink carrier.

17. The UE of claim 11, wherein, when the uplink carrier configuration comprises the positions of the fixed uplink sub-frames and flexible sub-frames, the sending and detection unit detects the uplink grant and performs the sending of the PUSCH data comprise:

for the sub-frame n on the uplink carrier of the FDD cell that is located in a position of a fixed uplink sub-frame or flexible sub-frame, the sending and detection unit detects the uplink grant of the sub-frame n in a downlink sub-frame n−z on a downlink carrier of the FDD cell; and if the uplink grant containing a HARQ procedure number of a scheduled PUSCH is detected, then the sending and detection unit newly transmits or retransmits PUSCH data corresponding to the HARQ procedure number in the sub-frame n on the uplink carrier, where z is a preset positive integer.

18. The UE of claim 10, wherein, when according to the uplink carrier configuration that the uplink/downlink sub-frame distribution is configured according to Tms on the uplink carrier of the FDD cell is determined, the sending and detection unit detects the uplink grant and performs sending of the PUSCH data and/or the detection of the PHICH data comprise:

for the sub-frame n on the uplink carrier, when the sending and detection unit detects the uplink grant of the sub-frame n in a downlink sub-frame n−z of the downlink carrier of the FDD cell, and the sending and detection unit detects PHICH data dedicated for PUSCH data of the sub-frame n in a downlink sub-frame n+z on the downlink carrier, and the sending and detection unit performs retransmission of the PUSCH data of the sub-frame n in an uplink sub-frame n+8 on the uplink carrier; where z is a preset positive integer, and T is 8 or 10.

* * * * *